UNITED STATES PATENT OFFICE.

JOHANNES WALTER, OF BASLE, SWITZERLAND, ASSIGNOR TO JOHN R. GEIGY & CO., OF SAME PLACE.

BROWN DYE.

SPECIFICATION forming part of Letters Patent No. 440,288, dated November 11, 1890.

Application filed February 13, 1880. Serial No. 340,345. (Specimens.)

*To all whom it may concern:*

Be it known that I, JOHANNES WALTER, of Basle, Switzerland, have invented a certain new and useful Process for the Production of Brown Coloring-Matter, of which the following is a specification.

This invention relates to the observation that monaozo dye-stuffs from diazotized naphthylamine or amidoazo-benzole or amidoazo-toluol sulpho-acid combined with metadiamines yield brown coloring-matter by further combination with one molecule of diazo-polychromine. This new dye-stuff dyes cotton in a neutral or slightly-alkaline bath, to which muriate of ammonia can be added. Vice versa, coloring-matters of equal qualities result by reaction of the diazo compounds of the above-named sulpho-acids upon the azo substances obtained from diazo-polychromine with metadiamines.

By polychromine I understand the sulpho-acid of thioparatoluidine, also called "primuline."

To carry out the invention, for instance, twenty-eight kilos of naphthionate of sodium, dissolved in water and mixed with thirty kilos of muriatic acid are diazotized by addition of eight kilos of nitrite of sodium. The solution of the diazo compound is then poured into a solution of 12.5 kilos of metaphenylene-diamine or the corresponding quantity of metatoluylenediamine and twenty kilos of caustic soda. To this is added, twenty-four hours later, the diazo compound obtained by diazotizing fifty-five kilos of polychromine (dissolved in water and then mixed with three to five kilos of muriatic acid) with eight kilos of nitrite of sodium. After another period of twenty-four hours the liquid is boiled and the dye-stuff precipitated with salt. When dried, it is a brown powder, easily soluble in water, difficultly soluble in spirit, a little better in methyl alcohol, and insoluble in benzol and ether. Concentrated sulphuric acid dissolves it with a magenta-like color.

The formula is the following:

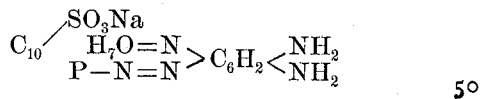

(P means the rest of polychromine, whose formula is not yet ascertained.)

I claim—

The brown coloring-matter, which is easily soluble in water, difficultly soluble in spirit, a little better in methyl alcohol, insoluble in benzine and ether, soluble in concentrated sulphuric acid, with magenta-red color, obtained by combination of metadiamines with two diazo compounds, of which one is diazotized polychromine and the other one of the diazo compounds of naphthylamine or amido-azobenzole or amidoazo-toluol sulpho-acid.

In testimony whereof I hereunto sign my name, in the presence of two subscribing witnesses, this 28th day of January, 1890.

JOHANNES WALTER.

Witnesses:
GEORGE GIFFORD,
CHS. A. RICHTER.